(12) United States Patent
Das et al.

(10) Patent No.: US 9,699,828 B2
(45) Date of Patent: Jul. 4, 2017

(54) OPTIMIZED SYNCHRONIZATION PROCEDURE FOR PROLONGED PERIODS OF SLEEP

(71) Applicant: TELEFONAKTIEBOLAGET L M ERICSSON (PUBL), Stockholm (SE)

(72) Inventors: Sajal Kumar Das, Bangalore (IN); Ravitej Ballakur, Bangalore (IN); Nicklas Johansson, Brokind (SE); Mats Samuelsson, Stocksund (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/719,225

(22) Filed: May 21, 2015

(65) Prior Publication Data
US 2015/0341884 A1   Nov. 26, 2015

Related U.S. Application Data

(60) Provisional application No. 62/021,967, filed on Jul. 8, 2014.

(30) Foreign Application Priority Data

May 22, 2014   (IN) .......................... 1349/DEL/2014

(51) Int. Cl.
*H04W 76/04*   (2009.01)
*H04W 56/00*   (2009.01)
*H04W 52/02*   (2009.01)

(52) U.S. Cl.
CPC ..... *H04W 76/048* (2013.01); *H04W 52/0209* (2013.01); *H04W 52/0216* (2013.01);
(Continued)

(58) Field of Classification Search
CPC . H04W 76/048; H04W 56/00; H04W 56/001; H04W 56/002; H04W 40/005
See application file for complete search history.

(56) References Cited

U.S. PATENT DOCUMENTS 8,260,328 B1   9/2012   Yellin et al.
8,457,112 B2   6/2013   Krishnamurthy et al.
(Continued)

FOREIGN PATENT DOCUMENTS

EP   2 574 135 A1   3/2013
EP   2 677 818 A1   12/2013
(Continued)

OTHER PUBLICATIONS

3GPP TSG GERAN #59, "A Solution to Long Paging cycles for MTC Devices", Source: Telefon AB LM Ericsson, ST-Ericsson, Tdoc: GP-130730, Agenda Item: 7.2.5.3.6,7.1.5.2.5, Sofia, Bulgaria, Aug. 26-30, 2013, the whole document.
(Continued)

*Primary Examiner* — Ashley Shivers (57) ABSTRACT

A wireless device and method are described herein for implementing synchronization procedures when the wireless device operates using a prolonged sleep mode in a cellular network, wherein the synchronization procedures have a benefit of reducing the energy consumption of the wireless device's battery.

12 Claims, 7 Drawing Sheets

(52) U.S. Cl.
CPC ....... *H04W 56/00* (2013.01); *H04W 56/0035* (2013.01); *Y02B 60/50* (2013.01)

(56) References Cited

U.S. PATENT DOCUMENTS

| | | | |
|---|---|---|---|
| 2007/0064662 A1* | 3/2007 | Bultan | H04W 52/0225 370/338 |
| 2007/0224992 A1 | 9/2007 | Dalsgaard et al. | |
| 2007/0291673 A1 | 12/2007 | Demirhan et al. | |
| 2008/0186892 A1 | 8/2008 | Damnjanovic | |
| 2008/0225772 A1 | 9/2008 | Xu | |
| 2009/0232054 A1 | 9/2009 | Wang et al. | |
| 2009/0262648 A1 | 10/2009 | Chun et al. | |
| 2010/0130237 A1 | 5/2010 | Kitazoe et al. | |
| 2010/0184458 A1 | 7/2010 | Fodor et al. | |
| 2011/0038348 A1 | 2/2011 | Borsella et al. | |
| 2011/0075558 A1 | 3/2011 | Isaksson et al. | |
| 2011/0195709 A1 | 8/2011 | Christensson et al. | |
| 2012/0188997 A1 | 7/2012 | Zakrzewski et al. | |
| 2013/0070589 A1 | 3/2013 | Diachina et al. | |
| 2013/0070699 A1 | 3/2013 | Diachina et al. | |
| 2013/0142178 A1* | 6/2013 | Kim | H04W 76/048 370/336 |
| 2013/0229931 A1 | 9/2013 | Kim | |
| 2013/0235855 A1 | 9/2013 | Diachina et al. | |
| 2013/0242975 A1 | 9/2013 | Krishnamurthy et al. | |
| 2013/0301501 A1* | 11/2013 | Olvera-Hernandez | H04W 76/048 370/311 |
| 2014/0064160 A1 | 3/2014 | Verger et al. | |
| 2014/0112221 A1 | 4/2014 | Verger et al. | |
| 2014/0198699 A1 | 7/2014 | Makharia et al. | |
| 2014/0226647 A1 | 8/2014 | Das et al. | |
| 2014/0321381 A1 | 10/2014 | Guo et al. | |
| 2014/0362754 A1 | 12/2014 | Moses et al. | |
| 2015/0003311 A1 | 1/2015 | Feuersaenger et al. | |

FOREIGN PATENT DOCUMENTS

| | | |
|---|---|---|
| GB | 2 402 301 A | 12/2004 |
| KR | 1020110057273 A | 5/2011 |
| KR | 10001241677 B1 | 3/2013 |
| WO | WO 2012/111483 A1 | 8/2012 |
| WO | WO 2012/173545 A1 | 12/2012 |
| WO | WO 2013/091505 A1 | 6/2013 |

OTHER PUBLICATIONS

Bontu, "DRX mechanism for power saving in LTE" IEEE Communications Magazine, Year: 2009, vol. 47, Issue: 6 pp. 48-55.
Andreev S. et al, "Analysis of second UE DRX cycle for enhanced CELL FACH 3GPP UTRAN," 2012 4th International Congress on Ultra Modern Telecommunications and Control Systems and Workshops (ICUMT), Year: 2012 pp. 7-11.
Jha S. et al., "Adaptive DRX configuration to optimize device power saving and latency of mobile applications over L TE advanced network" 2013 IEEE International Conference on Communications (ICC), Jun. 9-13, 2013, pp. 6210-6214.
Zhou L. et al., "Performance Analysis of Power Saving Mechanism with Adjustable DRX Cycles in 3GPP L TE" IEEE 68th Vehicular Technology Conference, 2008, VTC 2008 Fall, Year: 2008, pp. 1-5.

Jie Song, "Power savings for cell search application with DRX feature in L TE" 2012 9th International Conference on Fuzzy Systems and Knowledge Discovery (FSKD), Year: 2012, pp. 2953-2956.
Sunggeun Jin, "Numerical Analysis of the Power Saving in 3GPP L TE Advanced Wireless Networks," IEEE Transactions on Vehicular Technology, Year: 2012, vol. 61, Issue: 4, pp. 1779-1785.
3GPP TS 45.002 V12.1.0 (Nov. 2013), 3rd Generation Partnership Project; Technical Specification Group GSM/EDGE Radio Access Network; Multiplexing and multiple access on the radio path (Release 12), GP-60, version 12.1.0, available Dec. 19, 2013, the whole document.
P.J. Kootsookos: "A Review of the Frequency Estimation and Tracking Problems", CRC for Robust and Adaptive Systems DSTO, Salisbury Site Frequency Estimation and Tracking Project, Feb. 21, 1999, the whole document.
Das S.: "Mobile Handset Design", Wiley, 2010, section 10.8.3, pp. 326-327.
3GPP TR 21.905 V12.0.0 (Jun. 2013), 3rd Generation Partnership Project; Technical Specification Group Services and System Aspects; Vocabulary for 3GPP Specifications (Release 12), SP-60, version 12.0.0, available Jun. 25, 2013, the whole document.
3GPP TS 41.102 V4.8.0 (Mar. 2003), 3rd Generation Partnership Project; Technical Specification Group Services and System Aspects; GSM Release 4 specifications (Release 4), SP-19, version 4.8.0, available Mar. 27, 2003, the whole document.
GP-131136 (Rev of GP-131108), 3GPP TSG GERAN #60, Agenda item: 7.2.5.3.7, 7.1.5.3.5, China Mobile Communication Corporation, Zhuhai, P.R.China, Nov. 18-22, 2013, the whole document.
3GPP TS 23.682 V12.1.0 (Mar. 2014), 3rd Generation Partnership Project; Technical Specification Group Services and System Aspects; Architecture enhancements to facilitate communications with packet data networks and applications (Release 12), SP-63, version 12.1.0, available Mar. 10, 2014, the whole document.
GP-130473, "Longer Paging Cycles for the MTC use case ", 3GPP TSG GERAN #58, Agenda Item: 7.2.5.3.6, Source: Telefon AB LM Ericsson, ST-Ericsson, Xiamen, P.R. China, May 13-17, 2013, the whole document.
GP-131045, "A solution to long paging cycles for MTC devices" (Update of GP-130973), 3GPP TSG GERAN#60, Agenda item 7.1.5.4, 7.2.5.3.7, Source: Telefon AB LM Ericsson, Zhuhai, P.R. China, Nov. 18-22, 2013, the whole document.
3GPP TSG GERAN / WG2, TSGG#57(13)0093, "LS on requesting input on MTCe solutions", Vienna, Austria, Feb. 25-Mar. 1, 2013, the whole document.
3GPP TSG GERAN / WG2, TSGG#57(13)0249, "Reply LS on requesting input on MTCe solutions", Vienna, Austria, Feb. 25-Mar. 1, 2013, the whole document.
3GPP TS 44.018 V11.3.0 (Nov. 2012), 3rd Generation Partnership Project; Technical Specification Group GSM/EDGE Radio Access Network; Mobile radio interface layer 3 specification; Radio Resource Control (RRC) protocol (Release 11), SP-57, GP-56, available Jan. 1, 2013, the whole document.
3GPP TS 45.008 V11.4.0 (May 2013), 3rd Generation Partnership Project; Technical Specification Group GSM/EDGE Radio Access Network; Radio subsystem link control (Release 11), SP-57, GP-58, version 11.4.0, the whole document.
3GPP TS 45.002 V11.2.0 (Mar. 2013), 3rd Generation Partnership Project; Technical Specification Group GSM/EDGE Radio Access Network; Multiplexing and multiple access on the radio path (Release 11), SP-57, GP-57, available Mar. 15, 2013, the whole document.

* cited by examiner

502 — THE WIRELESS DEVICE IS CONFIGURED WITH A DRX CYCLE LENGTH = $T_L$, WHICH MEANS THE WIRELESS DEVICE SHOULD RECEIVE THE CCCH BLOCK'S FIRST BURST (i.e., THE FIRST BURST OF ITS NOMINAL PAGING BLOCK) AT THE START OF EVERY $T_L$ TIME PERIOD

504 — BEFORE GOING TO SLEEP, THE WIRELESS DEVICE SETS A TIMER WITH $T_d$ TO WAKE UP $T_w$ AHEAD OF THE START OF THE NEXT DRX CYCLE (i.e., THE VALUE OF $T_d$ DETERMINES THE LENGTH OF THE SLEEP DURATION, $T_s$). $T_s$ IS COMPUTED DYNAMICALLY BASED ON THE LENGTH OF $T_w$ COMPUTED. $T_w$ IS COMPUTED BASED ON:

- 504a — (1) COMPUTED LINEAR DRIFT OF LOCAL OSCILLATOR (LO) OVER THE ESTIMATED WIRELESS DEVICE SLEEP DURATION ($T_s$) = $\Delta f^* T_s$ = 'accumulated_FO_over_sleep'
- 504b — (2) COMPUTED NUMBER OF FB (N1), SB (N2), NB (N3) TO BE RECEIVED TO ENABLE A CORRECTION OF ESTIMATED Accumulated_FO_over_sleep
- 504c — (3) DYNAMICALLY COMPUTE $T_w$ FOR SYNCHRONIZATION CYCLE BASED ON:
  - ESTIMATED Accumulated_FO_over_sleep
  - COMPUTED NUMBER OF FBs, SBs, AND NBs TO BE RECEIVED TO ENABLE A CORRECTION OF ESTIMATED Accumulated_FO_over_sleep
  - COMPUTED $T_w$ BASED ON (i) KNOWN FRAME STRUCTURE INDICATES HOW MANY FBs, SBs, AND NBs ARE EXPECTED DURING A TIME PERIOD, (ii) KNOWN AMOUNT OF FREQUENCY DRIFT THAT CAN BE CORRECTED FROM EACH RECEPTION OF FB, SB, AND NB AND (iii) COMPUTED NUMBER OF FBs, SBs, AND NBs TO BE RECEIVED TO ENABLE A CORRECTION OF ESTIMATED Accumulated_FO_over_sleep

506 — IF (accumulated_FO_over_sleep > X)?
- YES → A TO FIG. 5B
- NO → B TO FIG. 5B

OPTIMIZED SYNCHRONIZATION PROCEDURE FOR PROLONGED PERIODS OF SLEEP

CLAIM OF PRIORITY

This application claims the benefit of priority to Indian Application No. 1349/DEL/2014, filed on May 22, 2014, and to U.S. Provisional Application Ser. No. 62/021,967, filed on Jul. 8, 2014, the entire contents of each of which are hereby incorporated by reference for all purposes.

TECHNICAL FIELD

The present disclosure relates generally to synchronization procedures in wireless devices and, more particularly, to techniques for realizing power savings in synchronization procedures in wireless devices that operate using a prolonged sleep mode.

BACKGROUND

The following abbreviations are herewith defined, at least some of which are referred to within the following description of the prior art and the present invention.

| | |
|---|---|
| 3GPP | Third Generation Partnership Project |
| BCC | Base Station Color Code |
| BCCH | Broadcast Control Channel |
| BSIC | Base Station Identification Code |
| CCCH | Common Control Channel |
| DB | Dummy Burst |
| DRX | Discontinuous Reception |
| FB | Frequency Burst |
| FCCH | Frequency Correction Channel |
| FDMA | Frequency Division Multiple Access |
| FO | Frequency Offset |
| GERAN | GSM EDGE Radio Access Network |
| GSM | Global System for Mobile Communications |
| ID | Identifier |
| M2M | Machine-to-Machine |
| MS | Mobile Station |
| MTC | Machine Type Communication |
| N | Burst Numbers |
| NB | Normal Burst |
| PSM | Power Saving Mode |
| RACH | Random Access Channel |
| RAU | Routing Area Update |
| RSSI | Received Signal Strength Indicator |
| SB | Synchronization Burst |
| SCH | Synchronization Channel |
| TBF | Temporary Block Flow |
| TDMA | Time Division Multiple Access |
| TSC | Training Sequence Code |

In the case of wireless devices, especially mobile devices or mobile stations (MSs), battery capacity may be severely restricted due to constraints on size and weight of the device. As battery capacity is limited, ensuring an optimal power management scheme for these devices is critical, especially for the case of devices such as Machine Type Communications (MTC) devices intended for machine-to-machine (M2M) communication without an external power supply. With a primary objective of exploring different options for realizing power savings in the case of MTC devices, a new study item on "Power Saving for MTC Devices" was agreed upon in the 3GPP Technical Specification Group (TSG) GERAN Meeting #60.

As networks and wireless devices are driven by independent clocks housed inside the respective entities, proper synchronization is needed for establishing effective communication between the entities. The Global System for Mobile Communications (GSM) is based on Time Division Multiple Access (TDMA) and Frequency Division Multiple Access (FDMA), and thus, time and frequency synchronization are needed for proper transmission and reception of information by wireless devices operating on GSM. In addition, with the introduction of MTC devices on wireless networks, in general, there is a dramatically reduced need for how frequently such MTC devices should be reachable for downlink communications. That is, MTC devices do not need to support legacy type paging operation wherein wireless devices can be paged as often as every few seconds. This dramatic reduction in the frequency of reachability for MTC devices introduces the opportunity for substantial power savings in that these types of wireless devices may experience a prolonged period of sleep between any two consecutive instances of reachability. Several methods for realizing prolonged periods of sleep are currently under consideration within 3GPP such as:

Long Paging cycle (Long DRX)
Power Saving Mode (PSM)
Mobile Power Off

However, the use of such prolonged periods of sleep increases the risk of the wireless device (e.g., MTC device) losing synchronization with the network, because the more time the wireless device remains in the sleep mode, the more the synchronization errors accumulate (i.e., the wireless device stops performing frequent synchronization verification upon entering sleep mode). As such, identifying new methods for wireless devices (e.g., MTC devices) to quickly and efficiently re-acquire synchronization with the network as the wireless devices approach a period of reachability (which starts with the first burst of the paging block associated with a wireless device's nominal DRX cycle) will be an important aspect of the power management scheme needed for these devices. Legacy methods for re-acquiring synchronization are considered unnecessarily energy intensive and should be subject to significant optimization considering the low mobility anticipated for many MTC devices.

The conventional method for acquiring synchronization during what is known as a synchronization cycle when a wireless device wakes-up from a sleep cycle before entering the period of reachability known as a reachability cycle (i.e., before entering the portion of its DRX cycle during which the wireless device can receive a paging message) can be referred to as "long sync" and includes the following:

Performing a full sync up procedure where the wireless device will read the Frequency Correction Channel (FCCH), correct the frequency base (and slot boundary) first, and then read the Synchronization Channel (SCH) for time frame number and right cell identification.

Reading the Broadcast Control Channel (BCCH) or Common Control Channel (CCCH) messages. However, because the FCCH and SCH bursts appear very infrequently in the GSM 51-multiframe (i.e., once every 10 TDMA frames), the wireless device will spend a lot of time looking for the FCCH and SCH and then using the FCCH and SCH to adjust/verify the synchronization.

However, this conventional synchronization method is far too complex, processing time intensive, and energy consuming considering the limited mobility expected for the large numbers of MTC devices, and thus, this conventional synchronization method can be viewed as non-optimized. Moreover, if the wireless device (e.g., MTC device) has been in sleep state for a long time, the frequency offset (FO)

may be too large (e.g., >10 KHz) to allow for successful reception of the wireless device's paging block as determined according to the wireless device's nominal DRX cycle. In this case, the wireless device has to do several FCCH receptions before the wireless device can receive the FCCH properly where the FO converges to <100 Hz, which is needed for subsequently performing a proper SCH decoding. If the wireless device is unable to complete the synchronization procedure before reception of the wireless device's paging block as determined according to the wireless device's nominal DRX cycle, then the wireless device will miss the paging block reception opportunity for which the wireless device awoke.

SUMMARY

A wireless device and method which address the problems associated with the conventional synchronization method are described in the present application. Advantageous embodiments of the wireless device and the method are further described in the present application.

In one aspect, a wireless device is configured with a DRX cycle which comprises a reachability cycle, a sleep cycle, and a synchronization cycle. The wireless device comprises a processor, and a memory that stores processor-executable instructions, wherein the processor interfaces with the memory to execute the processor-executable instructions, whereby the wireless device is operable to implement a compute operation and a set operation. In the compute operation, the wireless device computes, during the reachability cycle, a time ($T_W$) for the synchronization cycle during which a synchronization procedure is to be performed. In the set operation, the wireless device sets a timer with a time ($T_d$) based on the computed time ($T_W$) to wake up from the sleep cycle and perform the synchronization procedure. The reachability cycle occurs before the sleep cycle, and the sleep cycle occurs before the synchronization cycle. In one embodiment, the wireless device being operable to compute the time ($T_W$) for the synchronization cycle includes being operable to: (1) estimate a total accumulated frequency drift of the sleep cycle, wherein the total accumulated frequency drift is equal to $\Delta f^*T_S$, wherein $\Delta f$ is a frequency drift per unit time of a local oscillator in the wireless device, and wherein $T_S$ is an estimated duration of the sleep cycle; (2) compute a number of FBs, SBs, and NBs to be received to enable a correction of the estimated total accumulated frequency drift; and (3) compute the time ($T_W$) for the synchronization cycle based on (i) a known frame structure which indicates how many FBs, SBs, and NBs are expected during a certain period of time, (ii) a known amount of frequency drift that can be corrected from each reception of FB, SB, and NB, and (iii) the computed number of FBs, SBs, and NBs to be received to enable the correction of the estimated total accumulated frequency drift. The wireless device operating in this manner has the advantage of reducing the energy consumption of the wireless device's battery.

In another aspect, a method is implemented in a wireless device configured with a DRX cycle which comprises a reachability cycle, a sleep cycle, and a synchronization cycle. The method comprises a computing step and a setting step. In the computing step, the wireless device computes, during the reachability cycle, a time ($T_W$) for the synchronization cycle during which a synchronization procedure is to be performed. In the setting step, the wireless device sets a timer with a time ($T_d$) based on the computed time ($T_W$) to wake up from the sleep cycle and perform the synchronization procedure. The reachability cycle occurs before the sleep cycle, and the sleep cycle occurs before the synchronization cycle. In one embodiment, computing the time ($T_W$) for the synchronization cycle further comprises: (1) estimating a total accumulated frequency drift of the sleep cycle, wherein the total accumulated frequency drift is equal to $\Delta f^*T_S$, wherein $\Delta f$ is a frequency drift per unit time of a local oscillator in the wireless device, and wherein $T_S$ is an estimated duration of the sleep cycle; (2) computing a number of FBs, SBs, and NBs to be received to enable a correction of the estimated total accumulated frequency drift; and (3) computing the time ($T_W$) for the synchronization cycle based on (i) a known frame structure which indicates how many FBs, SBs, and NBs are expected during a certain period of time, (ii) a known amount of frequency drift that can be corrected from each reception of FB, SB, and NB, and (iii) the computed number of FBs, SBs, and NBs to be received to enable the correction of the estimated total accumulated frequency drift. The method has the advantage of reducing the energy consumption of the wireless device's battery.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
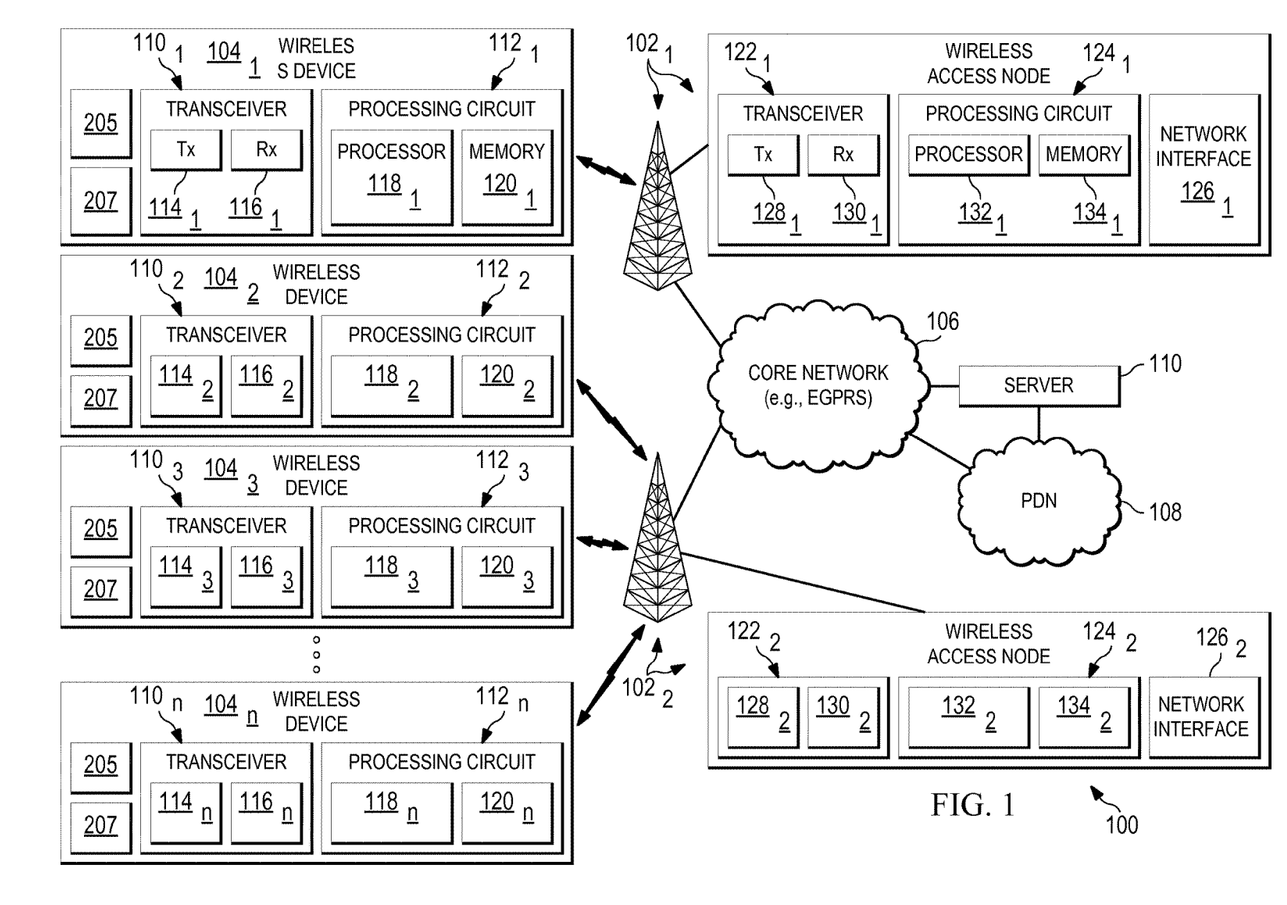
FIG. 1 is a diagram of an exemplary wireless communication network in accordance with the present disclosure.

To explain the technical features of the present disclosure, a discussion is provided first to describe an exemplary wireless communication network 100 which includes multiple wireless devices $104_1, 104_2, 104_3 \ldots 104_n$, each of which is configured in accordance with the present disclosure (see FIG. 1). Then, a discussion is provided to explain the functionality and configuration of the wireless devices $104_1, 104_2, 104_3 \ldots 104_n$ in accordance with the present disclosure (see FIGS. 2-3). Thereafter, a discussion is provided to explain in more detail various concepts associated with the functionality and configuration of the wireless devices $104_1, 104_2, 104_3 \ldots 104_n$ of the present disclosure (see FIGS. 4-7).

Exemplary Wireless Communication Network 100

Referring to FIG. 1, there is illustrated an exemplary wireless communication network 100 in accordance with the present disclosure. The wireless communication network 100 includes multiple wireless access nodes $102_1$ and $102_2$ (only two illustrated), multiple wireless devices $104_1, 104_2, 104_3 \ldots 104_n$, and a core network 106 (e.g., EGPRS core network 106). The wireless communication network 100 and its associated components also include many well-known components, but for clarity, only the components needed to describe the features of the present disclosure are described herein. Further, the wireless communication network 100 is described herein as being an GSM/EGPRS wireless communication network 100 which is also known as an EDGE wireless communication network 100. However, those skilled in the art will readily appreciate that the techniques of the present disclosure, which are applied to the GSM/EGPRS wireless communication network 100, are generally applicable to other types of wireless communication systems, including, for example, WCDMA, LTE, and WiMAX systems.

The wireless communication network 100 includes the wireless access nodes $102_1$ and $102_2$ (only two illustrated) that provide network access to the wireless devices $104_1, 104_2, 104_3 \ldots 104_n$. In this example, the wireless access node $102_1$ is providing network access to wireless device $104_1$ while the wireless access node $102_2$ is providing network access to wireless devices $104_2, 104_3 \ldots 104_n$. The wireless access nodes $102_1$ and $102_2$ are connected to the core network 106 (e.g., EGPRS core network 106). The core network 106 is connected to an external Packet Data Network (PDN) 108, such as the Internet, and a server 110 (only one illustrated). The wireless devices $104_1, 104_2, 104_3 \ldots 104_n$ may communicate with one or more servers 110 (only one illustrated) connected to the core network 106 and/or the PDN 108.

The wireless devices $104_1, 104_2, 104_3 \ldots 104_n$ may refer generally to an end terminal (user) that attaches to the wireless communication network 100, and may refer to either a MTC device or a non-MTC device. Further, the term "wireless device" is generally intended to be synonymous with the term "User Equipment," or UE, as that term is used by the 3rd-Generation Partnership Project (3GPP), and includes standalone wireless devices, such as terminals, cell phones, smart phones, tablets, and wireless-equipped personal digital assistants, as well as wireless cards or modules that are designed for attachment to or insertion into another electronic device, such as a personal computer, electrical meter, etc.

Likewise, the wireless access nodes $102_1$ and $102_2$ may refer in generally to a base station or central node in the wireless communication network 100, and may refer to wireless access nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1, 104_2, 104_3 \ldots 104_n$ may include a transceiver circuit $110_1, 110_2, 110_3 \ldots 110_n$ for communicating with the wireless access nodes $102_1$ and $102_2$, and a processing circuit $112_1, 112_2, 112_3 \ldots 112_n$ for processing signals transmitted from and received by the transceiver circuit $110_1, 110_2, 110_3 \ldots 110_n$ and for controlling the operation of the corresponding wireless device $104_1, 104_2, 104_3 \ldots 104_n$. The transceiver circuit $110_1, 110_2, 110_3 \ldots 110_n$ may include a transmitter $114_1, 114_2, 114_3 \ldots 114_n$ and a receiver $116_1, 116_2, 116_3 \ldots 116_n$, which may operate according to any standard, e.g., the GSM/EDGE standard. The processing circuit $112_1, 112_2, 112_3 \ldots 112_n$ may include a processor $118_1, 118_2, 118_3 \ldots 118_n$ and a memory $120_1, 120_2, 120_3 \ldots 120_n$ for storing program code for controlling the operation of the corresponding wireless device $104_1, 104_2, 104_3 \ldots 104_n$. The program code may include code for performing the procedures (e.g., computing the short sync up interval, predicting local clock deviation, determining whether FCCH or SCH bursts are present, identifying expected frequency correction, determining if accumulated frequency drift exceeds a threshold, and determining whether to perform intermediate short sync(s) or an extended short sync) as described hereinafter (e.g., see FIG. 2).

Each wireless access node $102_1$ and $102_2$ may include a transceiver circuit $122_1$ and $122_2$ for communicating with wireless devices $104_1, 104_2, 104_3 \ldots 104_n$, a processing circuit $124_1$ and $124_2$ for processing signals transmitted from and received by the transceiver circuit $122_1$ and $122_2$ and for controlling the operation of the corresponding wireless access node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$ and a memory $134_1$ and $134_2$ for storing program code for controlling the operation of the corresponding wireless access node $102_1$ and $102_2$. The program code may include code for performing one or more of the procedures as herein described.

Figure 2:
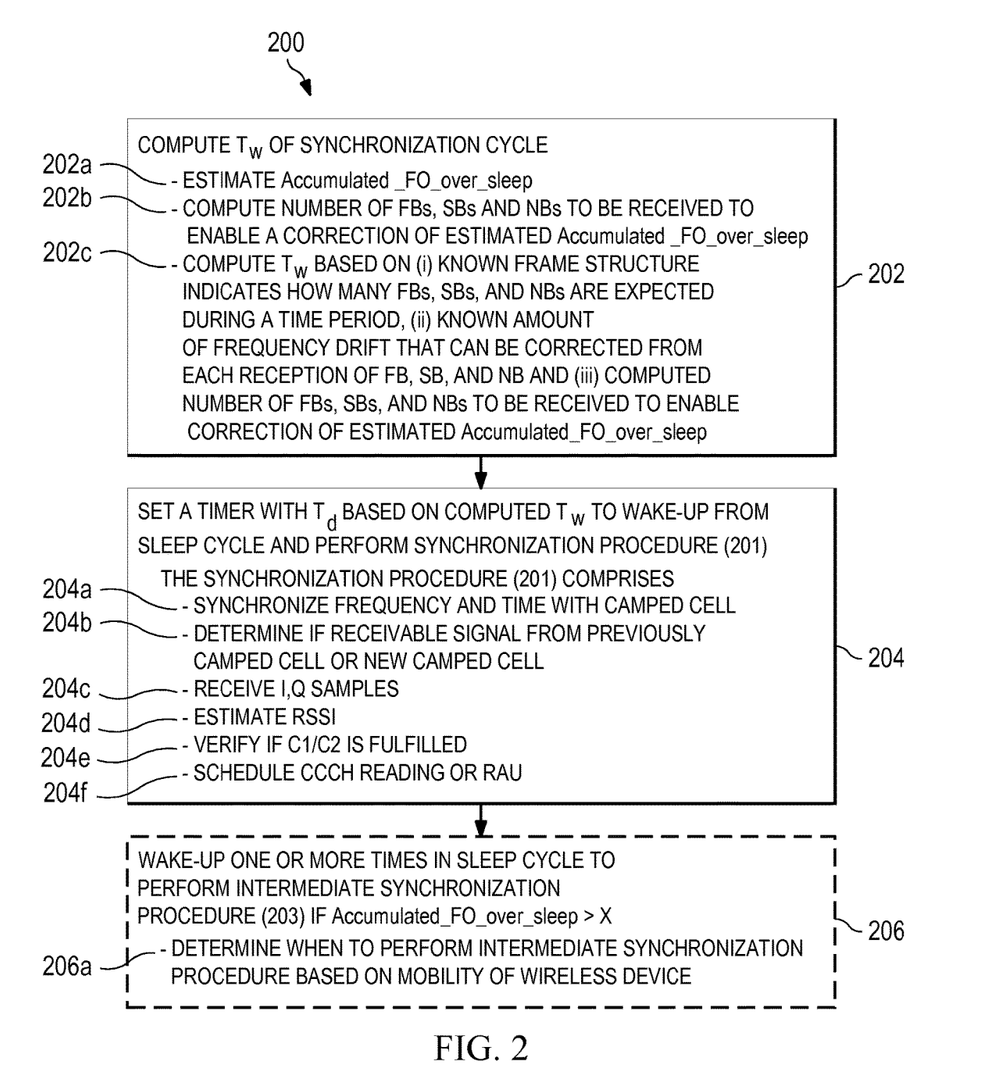
FIG. 2 is a flowchart of a method implemented by a wireless device in accordance with an embodiment of the present disclosure.
Figure 4:
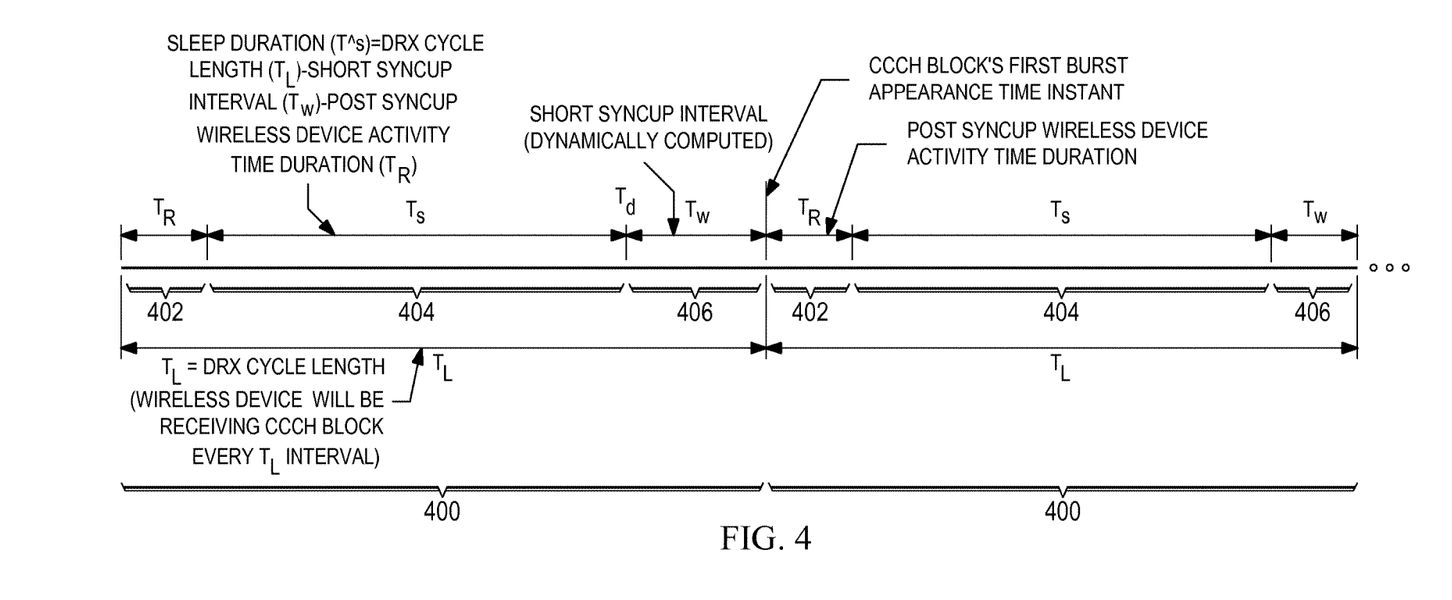
FIG. 4 is diagram illustrating a DRX periodicity, a sleep duration, and a dynamic short sync up interval associated with the wireless device in accordance with an embodiment of the present disclosure.

Functionality and Configuration of Wireless Devices $104_1, 104_2, 104_3 \ldots 104_n$ Referring to FIG. 2, there is a flowchart of a method 200 in the wireless device $104_1$ (for example), which is configured with a discontinuous reception (DRX) cycle 400, which comprises a reachability cycle 402, a sleep cycle 404, and a synchronization cycle 406 in accordance with an embodiment of the present disclosure (see FIG. 4—for graphical illustration of the DRX cycle 400 comprising the reachability cycle 402, the sleep cycle 404, and the synchronization cycle 406). Beginning at step 202, the wireless device $104_1$, during the reachability cycle 402, computes a time ($T_W$) (e.g., an amount of time $T_W$ needed) for the synchronization cycle 406 during which a synchronization procedure 201 (also referred to herein as "short syncup," "short sync up," "short synch," and/or "short sync") is to be performed. In one example, the computing step 202 comprises steps 202a, 202b, and 202c, although other examples of the synchronization procedure 201 may comprise a subset or superset of these steps, possibly in combination with other steps. At step 202a, the wireless device $104_1$ estimates a total accumulated frequency drift of the sleep cycle 404 (e.g., the total accumulated frequency drift that occurs during the sleep cycle 404), wherein the total accumulated frequency drift is equal to $\Delta f^* T_S$, wherein $\Delta f$ is a frequency drift per unit time of a local oscillator (LO) 205 (e.g., the frequency drift inherent to the performance of the local oscillator 205) in the wireless device $104_1$, and wherein $T_S$ is an estimated duration of the sleep cycle 404. Frequency drift is also referred to herein as "frequency offset," "FO," "frequency error," and/or "frequency deviation". Time duration is also referred to herein as "time window," "time period," and/or "time interval." It is to be noted that the value estimated for $T_S$ may be adjusted for a next iteration of the method 200 based on what the wireless device $104_1$ determines to be the nominal amount of time $T_W$ needed for the synchronization cycle 406. At step 202b, the wireless device $104_1$ computes a number of FBs, SBs, and NBs (e.g., the number of FBs, SBs, and NBs that are needed) to be received to enable a correction of the estimated total accumulated frequency drift. At step 202c, the wireless device $104_1$ computes the time ($T_W$) for the synchronization cycle 406 based on (1) a known frame structure which indicates how many FBs, SBs, and NBs are expected (e.g., the number expected to occur, appear, or be received) during a certain period of time, (2) a known amount of frequency drift that can be corrected from each reception of FB, SB, and NB, and (3) the computed number of FBs, SBs, and NBs to be received to enable the correction of the estimated total accumulated frequency drift. The reachability cycle 402 occurs before the sleep cycle 404, which occurs before the synchronization cycle 406. The computing step 202 is discussed in more detail below with respect to FIGS. 4-7.

At step 204, the wireless device $104_1$ sets a timer with a time ($T_d$) based on the computed time $T_W$ to wake up from the sleep cycle 404 and perform the synchronization procedure 201. In one example, the synchronization procedure 201 comprises steps 204a, 204b, 204c, 204d, 204e, and 204f, although other examples of the synchronization procedure 201 may comprise a subset or superset of these steps, possibly in combination with other steps. At step 204a, the wireless device $104_1$ synchronizes a frequency and a time with a camped cell (e.g., wireless access node $102_1$ of FIG. 1). At step 204b, the wireless device $104_1$ determines if the wireless device $104_1$ is receiving a signal associated with a previously camped cell or a new camped cell by checking a SB (i.e., specifically checking the value of the Base Station Color Code (BCC) portion of the Base Station Identification Code (BSIC) of the SB, which indicates a Training Sequence Code (TSC) number) or by checking a TSC number in any received NB. At step 204c, the wireless device $104_1$ receives in-phase and quadrature (I, Q) samples. At step 204d, the wireless device $104_1$ estimates a Received Signal Strength Indicator (RSSI) value using the received in-phase and quadrature (I, Q) samples. At step 204e, the wireless device $104_1$ verifies if a C1/C2 criterion is fulfilled using the estimated RSSI value. At step 204f, the wireless device $104_1$ schedules a Common Control Channel (CCCH) reading or a Routing Area Update (RAU) during the next reachability cycle 402 if the C1/C2 criterion is fulfilled. C1 is a path loss criterion parameter for cell selection, and C2 is a path loss criterion parameter for cell reselection obtained by calculation of the receiving level and number of parameters. C1/C2 criterion is path loss for cell selection/reselection criterion. C1 and C2 are discussed, for example, in 3GPP Technical Specification (TS) 43.022 V11.0.0, entitled "Functions related to Mobile Station (MS) in idle mode and group receive mode (Release 11)," the contents of which are hereby incorporated by reference herein. The synchronization procedure 201 is discussed in more detail below with respect to FIGS. 4-7.

At step 206, the wireless device $104_1$ wakes up one or more times during the sleep cycle 404 to perform one or more intermediate synchronization procedures 203 (also referred to herein as "intermediate short syncup," "intermediate short synch," and/or "intermediate short sync") when the estimated total accumulated frequency drift determined in step 202a exceeds a predetermined threshold "X". In one case, in step 206a, the wireless device $104_1$ can determine when to perform each of the one or more intermediate synchronization procedures 203 based on a mobility of the wireless device $104_1$. The determination of when to wake up to perform the intermediate synchronization procedure 203 is discussed in more detail below with respect to FIGS. 4-7.

Figure 3:
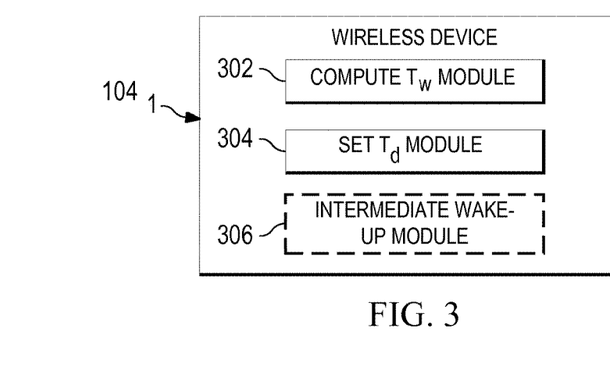
FIG. 3 is a block diagram illustrating structures of an exemplary wireless device configured in accordance with an embodiment of the present disclosure.

Referring to FIG. 3, there is a block diagram illustrating structures of an exemplary wireless device $104_1$ (for example), which is configured in accordance with an embodiment of the present disclosure. In an embodiment, the wireless device $104_1$ may comprise a compute $T_W$ module 302, a set timer with time $T_d$ module 304, and an intermediate wake-up module 306. The compute $T_W$ module 302 may be configured to compute, during the reachability cycle 402, a time ($T_W$) (e.g., an amount of time $T_W$ needed) for the synchronization cycle 406 during which the synchronization procedure 201 is to be performed. In one example, the compute $T_W$ module 302 may be configured to (1) estimate a total accumulated frequency drift of the sleep cycle 404 (e.g., the total accumulated frequency drift that occurs during the sleep cycle 404), wherein the total accumulated frequency drift is equal to $\Delta f^*T_S$, wherein $\Delta f$ is a frequency drift per unit time of a local oscillator 205 (e.g., the frequency drift inherent to the performance of the local oscillator 205) in the wireless device $104_1$, and wherein $T_S$ is an estimated duration of the sleep cycle 404; (2) compute a number of FBs, SBs, and NBs (e.g., the number of FBs, SBs, and NBs that are needed) to be received to enable a correction of the estimated total accumulated frequency drift; and (3) compute the time ($T_W$) for the synchronization cycle 406 based on (i) a known frame structure which indicates how many FBs, SBs, and NBs are expected (e.g., the number expected to occur, appear, or be received) during a certain period of time, (ii) a known amount of frequency drift that can be corrected from each reception of FB, SB, and NB, and (iii) the computed number of FBs, SBs, and NBs to be received to enable the correction of the estimated total accumulated frequency drift. The set timer with time $T_d$ module 304 may be configured to set the timer with the time ($T_d$) based on the computed time ($T_W$) to wake up from the sleep cycle 404 and perform the synchronization procedure 201. It is to be noted that the length of $T_W$ is determined based on the need that the synchronization procedure 201 during $T_W$ will have a high probability of succeeding without resorting to using the long sync procedure (i.e., the conventional method for acquiring synchronization). The intermediate wake-up module 306 may configure a timer with a time $T_{int}$ in order to wake up one or more times during the sleep cycle 404 to perform one or more intermediate synchronization procedures 203 when the estimated total accumulated frequency drift experienced during $T_S$ exceeds a predetermined threshold "X". This will then help ensure that there is a high probability that the total accumulated frequency drift that exists at the end of the sleep cycle 404 can be successfully corrected during $T_W$ without the wireless device $104_1$ having to resort to using the long sync procedure.

As those skilled in the art will appreciate, the above-described modules 302, 304, and 306 of the wireless device $104_1$ (for example) may be implemented separately as suitable dedicated circuits. Further, the modules 302, 304, and 306 can also be implemented using any number of dedicated circuits through functional combination or separation. In some embodiments, the modules 302, 304, and 306 may be even combined in a single application specific integrated circuit (ASIC). As an alternative software-based implementation, the wireless device 104₁ (for example) may comprise a memory 120₁ and a processor 118₁ (including but not limited to a microprocessor, a microcontroller or a Digital Signal Processor (DSP), etc.) and a transceiver 110₁. The memory 120₁ stores machine-readable program code executable by the processor 118₁ to cause the wireless device 104₁ (for example) to perform the above-described method 200. It should be appreciated that the other wireless device 104₂, 104₃ . . . 104ₙ may also be configured in a similar manner and perform the above-described method 200.

Detailed Functionality and Configuration of Wireless Devices 104₁, 104₂, 104₃ . . . 104ₙ

An optimized method 200 for the wireless device 104₁ to quickly acquire synchronization just prior to entering a period of reachability, referred to herein as "short sync" has been described above with respect to FIG. 2. This method 200 may generally include the following steps:

Computing the amount of time (referred to herein as the "short sync up interval") immediately prior to entering the next period of reachability that is needed to perform frequency and time synchronization (e.g., FIG. 2's step 202). That is, prior to entering a period of prolonged sleep, the wireless device 104₁ computes its next wake-up time, and thereby determines the number of bursts of the short sync up interval during which the wireless device 104₁ will attempt to acquire synchronization.

Predicting the local oscillator 205 (i.e., local clock) frequency deviation ($\Delta f^* T_S$) of the wireless device 104₁ according to the duration of an estimated prolonged period of sleep ($T_S$) associated with the sleep cycle 404, where $\Delta f$ is the frequency drift per unit time (e.g., frequency drift that is inherent to the performance) of the local oscillator 205 in the wireless device 104₁ (e.g., FIG. 2's step 202a).

Determining whether or not the FCCH or SCH bursts will be present within the portion of the 51-multiframe of the CCCH received during the short sync up interval. This is because the quantity of FCCH/SCH bursts occurring within the short sync up interval is variable.

Identifying the expected frequency correction applicable to Frequency Burst (FB), Synchronization Burst (SB), and Normal Burst (NB) reception based on the predicted local oscillator 205 frequency deviation, and applying the expected frequency correction while attempting to acquire synchronization using the FBs, SBs, and/or NBs (e.g., FIG. 2's steps 202a, 202b, and 202c).

Determining when the local oscillator 205 frequency deviation occurring over $T_S$ exceeds a threshold "X" (e.g., a maximum drift), in which case there will be a substantially increased probability of the wireless device 104₁ not being able to successfully acquire synchronization during the short sync up interval (e.g., synchronization cycle 406) (e.g., FIG. 5A's step 506 discussed below).

For the case where the local oscillator 205 frequency deviation occurring over $T_S$ exceeds the threshold "X", evaluating the trade-off between (a) performing one or more intermediate short syncs during the sleep cycle 404 ($T_S$) (e.g., FIG. 5B's steps 508, 510 and 512 and FIG. 6), and (b) making use of an extended version of the short sync up interval wherein the wireless device 104₁ can receive one or more instances of FCCH and SCH bursts within the portion of the 51-multiframe of the CCCH received during that extended short sync up interval (e.g., FIG. 2's step 206 where the wireless device 104₁ selects option (a) performing one or more intermediate synchronization procedures 203 during the sleep cycle 404 ($T_S$)).

Figure 5A:
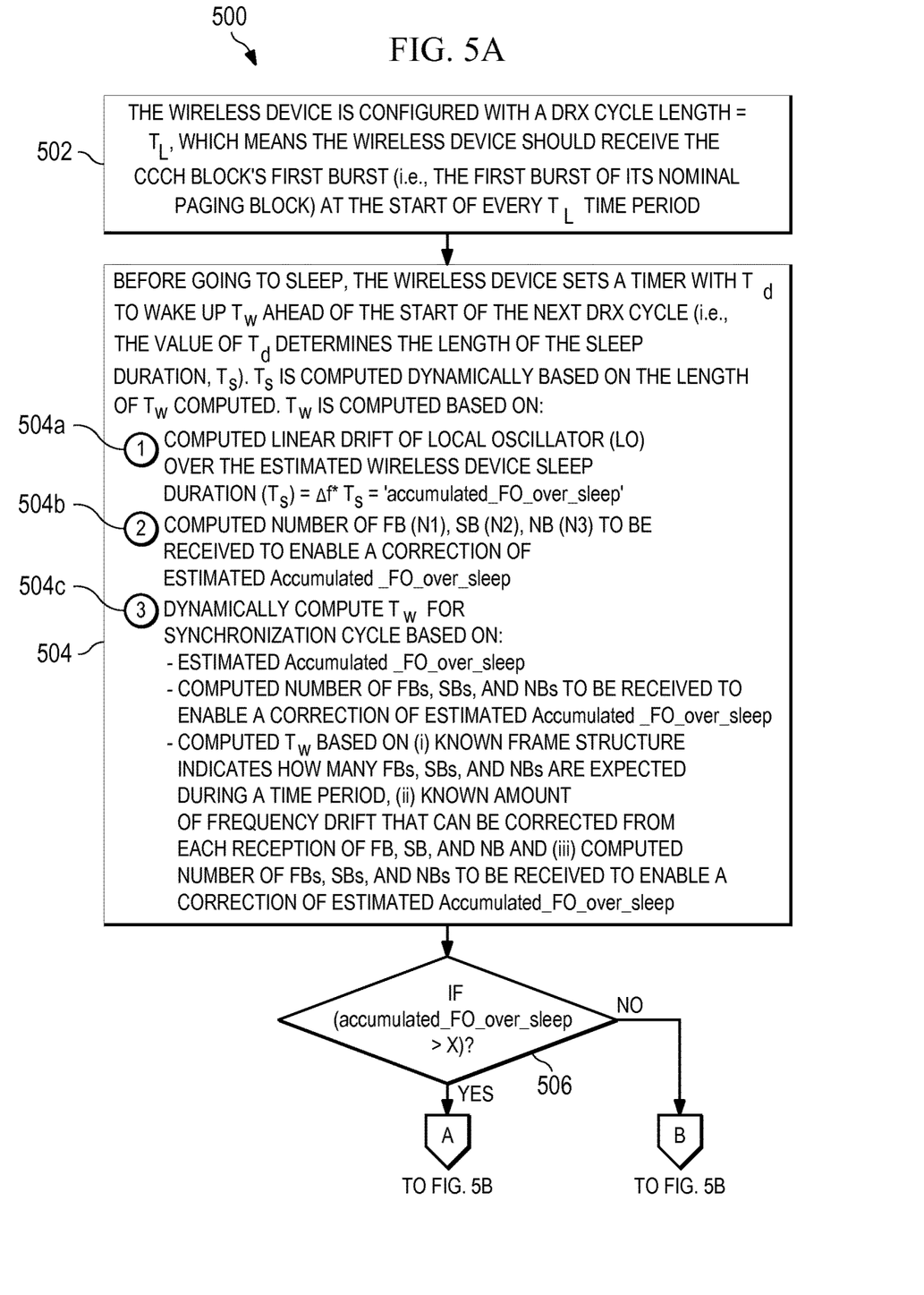
FIGS. 5A-5B is a flowchart of another method implemented by the wireless device in accordance with an embodiment of the present disclosure.
Figure 5B:
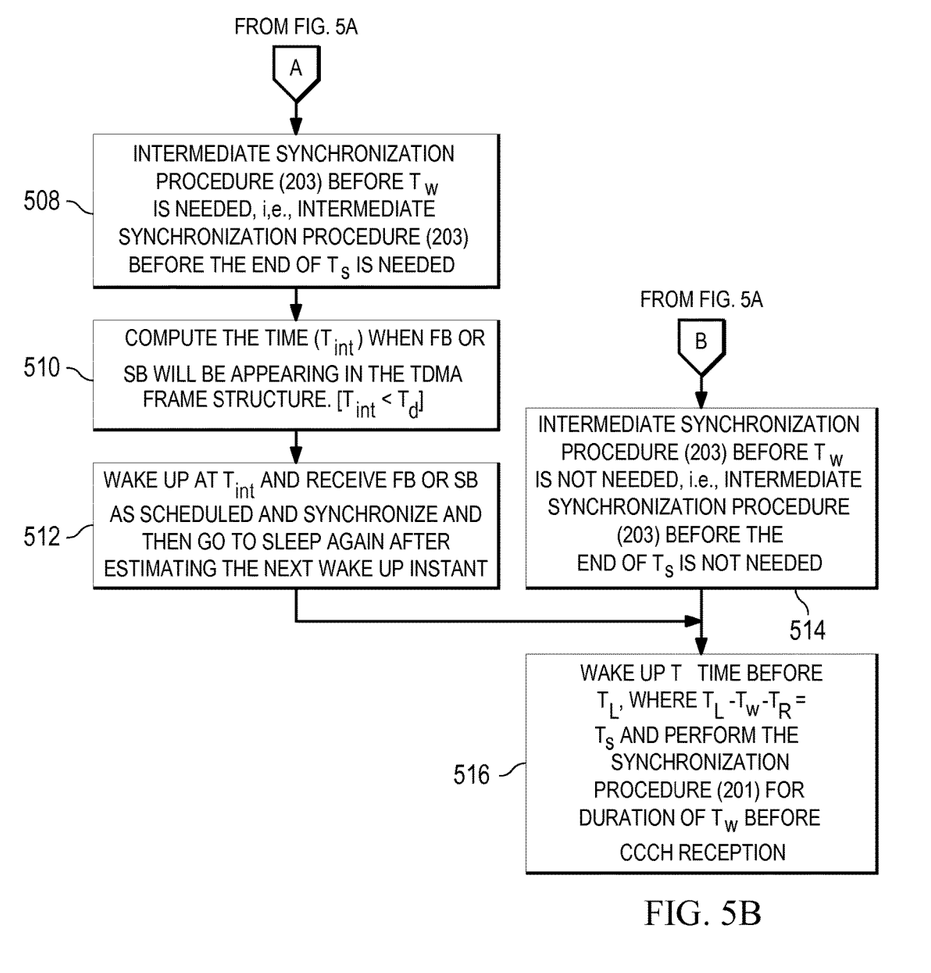

As illustrated in FIGS. 4 and 5A-5B, the wireless device 104₁ (e.g., MS, MTC device) is configured with a DRX cycle 400 having length=$T_L$, which means the wireless device 104₁ should be receiving the CCCH block's first burst (i.e., the first burst of the wireless device 104₁'s nominal paging block) at the start of every $T_L$ time period referred to herein as the reachability cycle 402 (e.g., FIG. 5A's step 502). However, in order to complete the short sync up activities before this CCCH block reading (as that will be needed to help maximize the probability of successful CCCH block reception), the wireless device 104₁ has to wake up early enough prior to receiving the first burst of the wireless device 104₁'s nominal paging block to perform the synchronization procedure 201 during the synchronization cycle 406. To accomplish this, the wireless device 104₁ dynamically computes during the previous reachability cycle 402 the short sync up interval (denoted as $T_W$), which is the needed length or time duration of the next short sync up interval (synchronization cycle 406), and sets a timer (e.g., timer 207 of the wireless device 104₁ in FIG. 1) with a time ($T_d$) to wake up at the start of the time period $T_W$ (e.g., FIG. 2's steps 202 and 204, and FIG. 5A's step 504). In addition, once the wireless device 104₁ begins reading the first burst of the wireless device 104₁'s nominal paging block, the wireless device 104₁ enters a period of reachability denoted as $T_R$ (reachability cycle 402) at the end of which the wireless device 104₁ computes the next short sync up interval (denoted as $T_W$) and then once again enters a period of sleep (sleep cycle 404). Here, the post sync up (also referred to as "post syncup") activity time duration is denoted as $T_R$ (reachability cycle 402), during which time the wireless device 104₁ performs several other tasks as may be required, including a CCCH block reading and/or a Routing Area Update (RAU). Effectively, the wireless device 104₁ stays in the sleep cycle 404 for a duration of $T_S = T_L - T_W - T_R$. The shorter the short sync up interval ($T_W$), and the greater the length of $T_S$, the better the battery energy saving. This is because the wireless device 104₁ spends more time in sleep mode, where the wireless device 104₁ can cut the voltages and clocks to different operational modules for achieving optimum power saving.

The DRX cycle 400 includes a limited period of reachability (reachability cycle 402) followed by a prolonged period of sleep (sleep cycle 404) and then the short sync up interval (synchronization cycle 406). Just before going to sleep, the wireless device 104₁ will set the timer (e.g., timer 207 of the wireless device 104₁ in FIG. 1) with the time ($T_d$) to wake up after time $T_S$, which is $T_W$ time ahead of the start of the next DRX cycle that starts at the end of the short sync up interval (synchronization cycle 406). In the short sync up interval ($T_W$), there will be N bursts (i.e., $T_W$ includes an integer number of consecutive 577 μs bursts). Thus, typically, the wireless device 104₁ will be receiving N number of bursts prior to receiving the first burst of the wireless device 104₁'s nominal paging block (on the CCCH) at the start of the wireless device 104₁'s DRX cycle length $T_L$. Accordingly, N is the total number of bursts (slots) that the wireless device 104₁ will receive on the tuned cell broadcast frequency (i.e., camped cell), for example, all the slots (slot-0 to slot-7) over the TDMA frames and not just slot-0. Here, the short sync method 200 helps to dynamically decide how many bursts ahead of the start of the wireless device $104_1$'s next DRX cycle length $T_L$ the wireless device $104_1$ should wake up to perform the frequency and time synchronization.

As GSM is a TDMA and FDMA based system, time and frequency synchronizations are needed for proper transmission and reception of user plane and signaling information. During the DRX sleep cycle 404, the wireless device $104_1$ does not transmit or receive any bursts, so the wireless device $104_1$'s local time (counter) and frequency base gradually drift, and corresponding errors accumulate over time. As such, upon waking up to perform the synchronization procedure 201, the wireless device $104_1$ needs to estimate and correct the accumulated error (as best as possible) before starting the communication (reading the first burst of a paging block or performing an uplink transmission) (e.g., FIG. 2's step 202a, FIG. 5A's step 504a). Accordingly, the wireless device $104_1$ will wake up a few slots (say 'N' slots) ahead of the scheduled paging block reception start time which is determined according to the wireless device $104_1$'s nominal DRX cycle 400 (i.e., these few slots are referred to herein as the short sync up interval $T_W$).

This short sync up interval $T_W$ (synchronization cycle 406), with duration N*577 μsec, will be dynamically computed by the wireless device $104_1$ based on the start time of the next DRX cycle 400, and the expected FB, SB, NB's presence in the portion of the TDMA 51-multiframe structure occurring just before the start time of the next DRX cycle 400 of the presently camped cell broadcast frequency. Plus, the wireless device $104_1$ generally knows, or can acquire or determine, the drift of the wireless device $104_1$'s local oscillator 205 over time such that the wireless device $104_1$ can predict and estimate the coarse value of Frequency Offset (FO) over the sleep time interval (also referred to herein as accumulated_FO_over_sleep) (e.g., FIG. 2's step 202a, FIG. 5A's step 504a). Accordingly, the wireless device $104_1$ can perform the following:

(a) Estimate the accumulated_FO_over_sleep—the wireless device $104_1$ knows the rate of linear frequency drift of the local oscillator 205 over time (i.e., Δf). If the estimated sleep duration is $T_S$, then the total accumulated frequency drift over sleep duration will be $T_S$*Δf. So, the accumulated_FO_over_sleep=$T_S$*Δf (e.g., FIG. 2's step 202a and FIG. 5A's step 504a).

(b) Compute the number of FB, SB, and NB (e.g., N1, N2, and N3 respectively) expected over the 'N' bursts (slots) occurring just before the actual start of the next DRX cycle 400. That means that in the time interval $T_W$, there will be N1 number of FBs, and N2 number of SBs, and N3 number of NBs present/appearing/occurring. These 'N' bursts are counted using bursts from all timeslots occurring from the start of $T_W$ until the first burst of the wireless device $104_1$'s nominal paging block (i.e., not just bursts occurring in timeslot 0). This is possible because the wireless device $104_1$ knows the TDMA frame structure, which indicates how many FBs, SBs, and NBs can be expected to be received (e.g., appear in the TDMA frame structure) during a period of time (e.g., FIG. 2's step 202c(i) and FIG. 5A's step 504c(i)).

(c) Compute the number of FBs, SBs, and NBs to be received to enable the correction of the estimated total accumulated frequency drift (accumulated_FO_over_sleep) (e.g. FIG. 2's step 202b and FIG. 5A's step 504b). This is possible because it is known that if a FB is detected in the short sync up interval ($T_W$), then the amount of frequency drift that could be corrected for one FB=Δf1. Similarly, if a SB is detected in the short sync up interval ($T_W$), then the amount of frequency drift that could be corrected for one SB=Δf2, and if an NB is detected in the short sync up interval ($T_W$), then the amount of frequency drift that could be corrected for one NB=Δf3 (e.g., FIG. 2's step 202c(ii) and FIG. 5A's step 504c(ii)). Hence, the wireless device $104_1$ can determine what the wireless device $104_1$ needs to receive in order to fulfill the synchronization need by correcting the estimated accumulated_FO_over_sleep. In particular, the wireless device $104_1$ can make the following determination: N1*(Δf1)+N2*(Δf2)+N3*(Δf3)≥estimated accumulated_FO_over_sleep, where N1 is the number of FBs, N2 is the number of SBs, and N3 is the number of NBs expected over the 'N' bursts during the short sync up interval (synchronization cycle 406) immediately preceding the first burst of the paging block associated with the wireless device $104_1$'s nominal DRX cycle 400 (e.g., N1+N2+N3=N). Generally, Δf1>Δf2>Δf3, so, if more FBs or SBs appear in the $T_W$ time duration, then fewer the number of total bursts will be needed to be received (e.g., N will be lower in value). A lower N value is preferred, because that will reduce the $T_W$ duration. Thus, the wireless device $104_1$ will dynamically adjust the value of $T_W$ based on the appearance/occurrence of FBs, SBs just before the actual start of the next DRX cycle 400 in order to optimize the power consumption of the wireless device $104_1$ and, at the same time, satisfy the need for synchronization.

(d) Compute the time ($T_W$) for the synchronization cycle 406 and when to wake up from the sleep cycle 404 to perform the synchronization procedure 201 based on (i) a known frame structure (e.g., TDMA frame structure), which indicates how many FBs, SBs, and NBs are expected (e.g., the number expected to occur, appear, or be received) during a certain period of time, (ii) a known amount of frequency drift that can be corrected from each reception of FB, SB, and NB, and (iii) the computed number of FBs, SBs, and NBs to be received to enable the correction of the estimated total accumulated frequency drift (e.g., FIG. 2's step 202c and FIG. 5A's step 504c).

Figure 6:
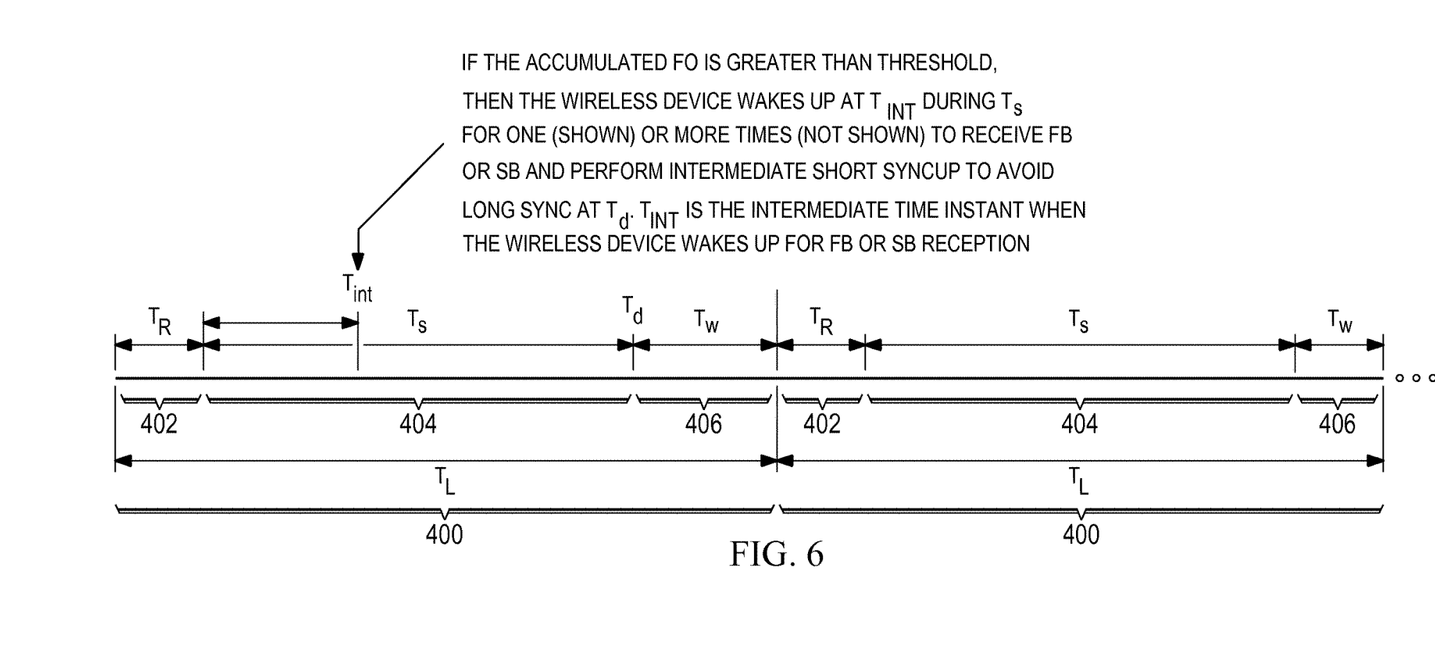
FIG. 6 is a diagram illustrating an Intermediate short sync procedure (at time instant $T_{int}$) that is implemented when the total accumulated FO over sleep duration $T_S$ is greater than a Threshold "X" per the method illustrated in FIGS. 5A-5B in accordance with an embodiment of the present disclosure; and, FIG. 7 is a diagram illustrating a short sync before CCCH reception using FB, SB, or NB over time window $T_W$ per the method illustrated in FIGS. 5A-5B in accordance with an embodiment of the present disclosure.

(e) If the 'accumulated_FO_over_sleep' over the sleep duration $T_S$ is greater than a threshold value "X" (e.g., a maximum FO value that the wireless device $104_1$ can tolerate, below which limit the wireless device $104_1$ will be able to reliably estimate the TDMA frame structure without performing the long sync procedure), then that indicates the wireless device $104_1$ will not be able to synchronize to the camped cell again if the wireless device $104_1$ wakes up after such a long interval (sleep duration) (e.g., FIG. 5A's step 506). In that case, a long sync procedure will be needed at wake-up, which means more power consumption. In order to avoid the need to perform the long sync procedure, the wireless device $104_1$ may decide to wake up one or more times during the sleep period defined by $T_S$ and perform an intermediate synchronization procedure 203 by receiving a FCCH or a SCH (e.g., FIG. 5B's step 508). To accomplish this, the wireless device $104_1$ computes the timer value $T_{int}$ when a FB or a SB will be appearing/occurring in the TDMA frame structure (e.g., FIG. 5B's step 510). Then, the wireless device $104_1$ would wake up at $T_{int}$ and receive the FB or the SB as scheduled and synchronize and then go to sleep again after estimating the next wake-up instance (e.g., FIG. 5B's step 512). The periodicity of performing the intermediate synchronization procedure 203 during the sleep duration (sleep cycle 404) ensures that the TDMA frame structure timing will continue to be known reliably, so that the wireless device $104_1$ knows where the FB or the SB will appear. This process is also illustrated in FIG. 6.

Figure 7:
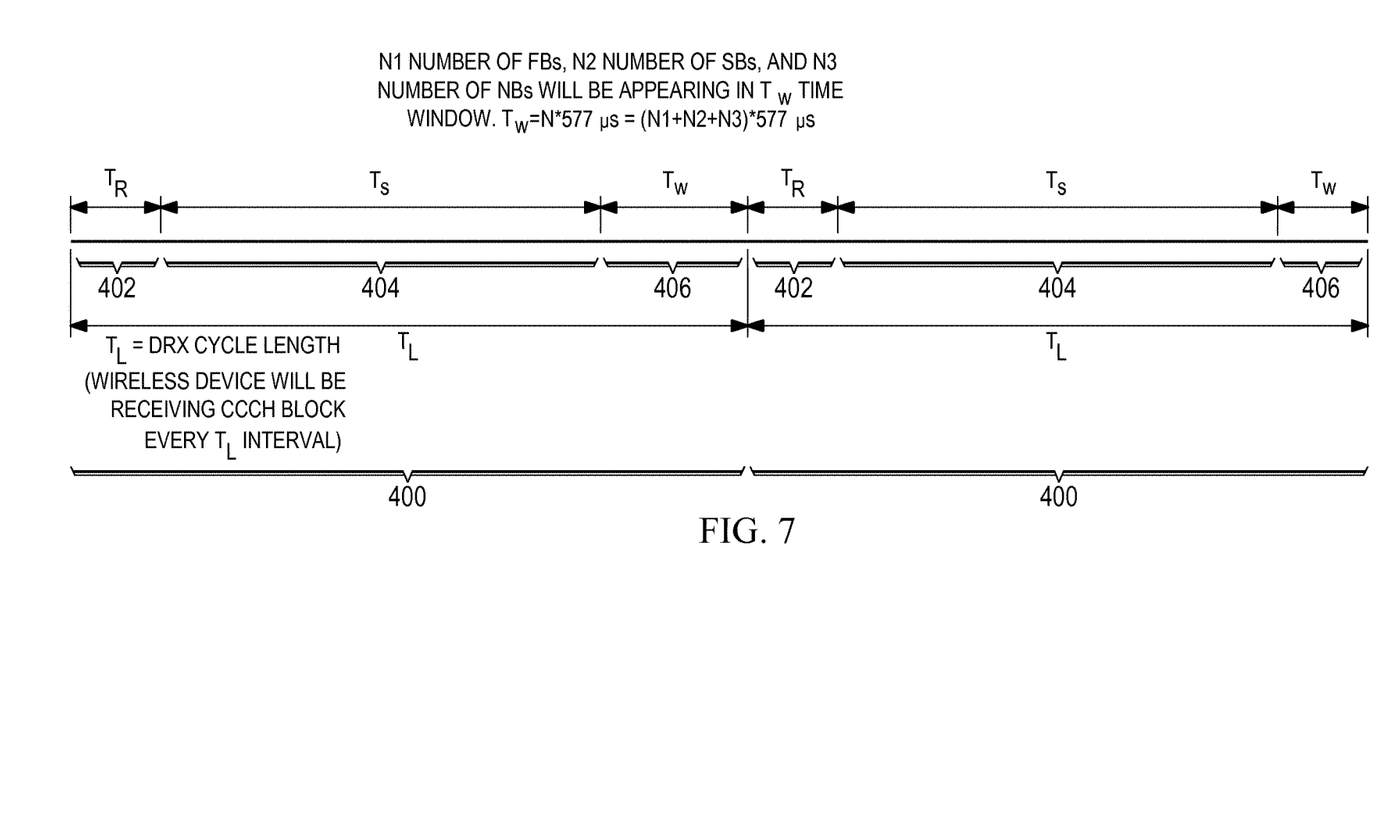

(f) If the 'accumulated_FO_over_sleep' over the sleep duration $T_S$ is less than or equal to the threshold value "X," then the wireless device $104_1$ need not perform the intermediate synchronization procedure 203 and can wake up at time $T_W$ before $T_L$ and perform the synchronization procedure 201 for the duration of $T_W$ before the CCCH reception (e.g., FIG. 5B's steps 506, 514, and 516). This process is also illustrated in FIG. 7.

(g) The wireless device $104_1$ would perform the method 500 illustrated in FIGS. 5A-5B during each DRX cycle 400.

As a part of the synchronization procedure 201, the wireless device $104_1$ performs the frequency offset estimation, correction, and burst boundary correction (e.g., FIG. 2's step 204a). The wireless device $104_1$ can use the FB, SB, and NB for this purpose. In this regard, the FB has all known sequences, the SB has 64-bit known sequences (i.e., all SBs in a GSM system use the same 64-bit training sequence), and the NB has 26-bit known sequences (i.e., there are 8 possible 26-bit training sequences inside the NB). In an NB, out of the eight possible Training Sequence Codes (TSCs) (i.e., the 26-bit training sequences), which one is used can be determined based on the previously camped cell's ID (i.e., based on the serving cell used during the previous synchronization procedure 201), as discussed, for example, in 3GPP TS 45.002 v12.1.0, entitled "Multiplexing and multiple access on the radio path (Release 12)," the contents of which are hereby incorporated by reference herein. Generally, a wireless device can use any standard frequency error estimation algorithm for estimation of the frequency error from the received burst's known bits (e.g., details of examples can be found in the references: (1) U.S. Patent Publication No. 2014/0226647 to Das et al.; (2) P. J. Kootsookos, "A Review of the Frequency Estimation and Tracking Problems," Feb. 21, 1999 (available at http://espace.library.uq.edu.au/view/UQ:10626/comparison-t.pdf); and (3) Sajal Kumar Das, "Mobile Handset Design," WILEY, 2010, section 10.8.3 (available at https://books.google.co.in/books?isbn=1118684575), wherein the contents of these documents are hereby incorporated by reference herein). The wireless device $104_1$ already knows the cell ID and the cell broadcast frequency of the previously camped cell, and there is a direct mapping between the cell ID (i.e., Base Station Identity Code (BSIC)) and the training sequence code (TSC) used in a control channel's NB, as specified in 3GPP TS 45.002 v12.1.0 referenced above. Therefore, by knowing the BSIC number of the cell, the wireless device $104_1$ can determine which training sequence code number out of eight possible training sequences (as mentioned above) will be appearing in the received NB assuming the serving cell is the previously camped cell. There is a possibility that the wireless device $104_1$ might receive a dummy burst (DB) instead of a NB. Thus, the wireless device $104_1$ should consider that possibility during the dynamic computation of the short sync up interval $T_W$ expressed in burst numbers (N). In light of the above, the following steps may be followed in the synchronization procedure 201:

(1) Before going to sleep, the wireless device $104_1$ programs (e.g., determines and/or sets) the next wake-up time $T_d$ based on the dynamically computed value of N. Thus, after going to sleep (i.e., entering a power saving state), the wireless device $104_1$ will either (a) wake up at $T_d$, which is N bursts (N*577 μsec=short sync up interval) ahead of the first burst of the next paging block associated with the wireless device $104_1$'s nominal DRX cycle 400 (e.g., FIGS. 5A-5B's steps 506, 514, and 516), or (b) wake up at time "$T_{int}$" after going to sleep if the estimated 'accumulated_FO_over_sleep' over the sleep duration (i.e., determined by the wireless device $104_1$'s nominal DRX cycle) exceeds a threshold value "X" (e.g., FIGS. 5A-5B's steps 506, 508, 510, and 512).

The wireless device $104_1$ may need to wake up according to time "$T_{int}$" one or more times during the sleep period if the estimated 'accumulated_FO_over_sleep' over the sleep duration exceeds a threshold value "X".

For example, if the threshold value "X"=40% of the length of the nominal DRX cycle 400, then (a) just prior to going to sleep, the wireless device $104_1$ sets a timer with a time="$T_{int}1$," where the value of "$T_{int}1$" is determined by the threshold value "X," (b) upon expiry of "$T_{int}1$," the wireless device $104_1$ performs a first intermediate synchronization procedure 203 and then starts a timer with a time="$T_{int}2$," where the value of "$T_{int}2$" is determined by the threshold value "X," (c) upon expiry of "$T_{int}2$," the wireless device $104_1$ performs a second intermediate synchronization procedure 203 and then starts a timer with a time="$T_{int}3$," where the value of "$T_{int}3$" is determined by the time remaining until the start of the N bursts immediately preceding the first burst of the paging block associated with the wireless device $104_1$'s nominal DRX cycle 400, and (d) upon expiry of "$T_{int}3$," the wireless device $104_1$ performs a third intermediate synchronization procedure 203.

(2) At the wake-up, the wireless device $104_1$ may apply the pre-estimated frequency offset accumulated during sleep and then receive N bursts during the short sync up interval and try to correct any remaining frequency error and time error, as described above (e.g., FIG. 2's step 204a). It is to be noted that the wireless device $104_1$ could perform the same steps when implementing the intermediate synchronization procedure 203 at expiration of time $T_{int}$ as the wireless device $104_1$ does when performing the synchronization procedure 201 at expiration of time $T_d$.

(3) During the short sync up interval, the wireless device $104_1$ also confirms whether the wireless device $104_1$ is receiving the previously camped cell's signal or a new camped cell's signal by checking the SB (if the SP appears/occurs in the set of N bursts) or by checking the TSC number on any received NB over that cell broadcast frequency as described above (e.g., FIG. 2's step 204b).

(4) During the short sync up interval, the wireless device $104_1$ is also receiving the in-phase and quadrature (I, Q) samples from the camped cell frequency and uses them to estimate the Received Signal Strength Indicator (RSSI) value, and using that, the wireless device $104_1$ also verifies the C1/C2 criterion (e.g., FIG. 2's steps 204c, 204d, and 204e).

(5) If the C1/C2 criterion is fulfilled, the cell is confirmed via the NB's TSC number or via the SB's BSIC, and needed frequency and time synchronization is performed, at which point the wireless device $104_1$ will schedule the CCCH reading (i.e., the wireless device $104_1$ schedules the reading of the wireless device $104_1$'s paging block determined according to the wireless device $104_1$'s nominal DRX cycle 400) or a Routing Area Update (RAU) (e.g., FIG. 2's step 204f).

Ideally, the synchronization, C1/C2 criterion checking, and cell identification are performed within the short sync up interval (synchronization cycle 406) comprising N bursts, which is N*577 μsec before the first burst of the next paging block associated with the wireless device $104_1$'s nominal DRX cycle 400.

Generally, the short sync up interval (synchronization cycle 406) may be very time-limited (e.g., varying between 3 to 10 ms) and consumes very little battery energy. Additionally, the last used serving cell might not be the best cell to stay camped-on. However, if the wireless device $104_1$ is managing to synchronize with that last used serving cell and the C1/C2 criterion is fulfilled, that last used serving cell may be considered as a sufficiently good cell to stay camped-on to receive paging messages or to start an uplink Random Access Channel (RACH) transmission. Once a communication link is established (i.e., a Temporary Block Flow (TBF) is set up), the wireless device $104_1$ might eventually move to the best suitable cell as per legacy cell re-selection procedure.

Due to mobility, the wireless device $104_1$ might change the cell from time to time. As discussed above, during the synchronization procedure 201, the wireless device $104_1$ tries to determine whether the wireless device $104_1$ has changed the cell or still remains in the same cell (e.g., FIG. 2's step 204b). To accomplish this, the wireless device $104_1$ checks the TSC number in the NB or the TSC number indicated by the BSIC of the SB of the BCCH frequency. As mentioned above, during the synchronization procedure 201, the wireless device $104_1$ receives several NBs and during that time, the wireless device $104_1$ detects whether the TSC number present in the NB is the same as, or different from, the previous time detected TSC number in the NB. If the TSC number is the same as expected, then that indicates the wireless device $104_1$ is still monitoring the same cell's signal and along with that, the C1/C2 criterion confirms further that the wireless device $104_1$ is still in the previously connected cell and the signal strength (RSSI) of that cell is good enough to be camped on to monitor CCCH or perform an RAU.

The length of the intermediate short sync interval (started at expiration of time $T_{int}$) is also determined by the mobility of the wireless device $104_1$. There could be several ways by which the wireless device $104_1$ can determine or acquire the wireless device $104_1$'s mobility criteria or rate of mobility. For instance, the wireless device $104_1$ can be designed to be stationary. In this case, the wireless devices $104_1$ can have a pre-programmed device configuration flag which indicates that, and during the dynamic estimation of a short sync up interval, nothing specific to mobility needs to be considered. On the other hand, if the wireless device $104_1$ is flagged to be a mobile device (e.g., the wireless device $104_1$ is not pre-programmed as a stationary device), then based on the wireless device $104_1$'s known mobility rate (e.g., detected as Low, Medium, or High), the time $T_d$ at which to start a short sync up interval could be determined by taking into account the time/frequency synchronization need of performing a long sync procedure (due to an increased probability of the synchronization procedure 201 failing due to device mobility) and possibly, also the estimated time to read the BCCH and perform an RAU (e.g., for the high mobility scenario).

During the intermediate synchronization procedure 203, if the wireless device $104_1$ determines that the wireless device $104_1$ has changed the location (e.g., as a result of TSC analysis), then immediately (e.g., without a delay) a long sync procedure, and when necessary, also an RAU, can be performed and then followed by the synchronization procedure 201 during the next synchronization procedure to keep the wireless device $104_1$ always in sync and properly linked to a reasonably good cell at any point of time.

Furthermore, if the setting of the timer with the time $T_d$ is such that it results in the synchronization cycle ($T_W$) 406 not being long enough to perform a long sync procedure, and the synchronization procedure 201 results in the wireless device $104_1$ determining that a cell change has occurred, then the wireless device $104_1$ may not be ready in time to read a paging block during the reachability cycle 402 in accordance to the wireless device $104_1$'s nominal DRX cycle 400. To address this situation, the wireless device $104_1$ implementation may also allow for detecting periods of mobility interspersed with periods of no (or low) mobility and adjusting the setting of the timer with the time $T_d$ accordingly. For example, during periods of high mobility, the length of $T_W$ will be increased, resulting in (a) a shorter sleep duration $T_S$, and (b) a more extensive set of tasks being performed when waking up at time=$T_d$, with the net result being a reduced power savings during these periods. In high mobility scenarios, the synchronization cycle ($T_W$) 406 needs to be longer so the wireless device $104_1$ can, in the event of the synchronization procedure 201 failing, still have enough time to perform a long sync procedure and subsequent RAU signaling to ensure such that the core network 106 will page the wireless device $104_1$ in the correct Routing Area.

Some Advantages of the Disclosed Techniques

The disclosed optimized methods 200 and 500 (i.e., short sync, synchronization procedure 201) used for acquiring synchronization allows for a significantly reduced amount of processing in a wireless device $104_1$, and therefore, significantly reduced energy consumption, as compared to conventional synchronization methods. The disclosed optimized methods 200 and 500 may also be critical for cases where the wireless device $104_1$ makes use of prolonged periods of sleep (e.g., MTC devices for which downlink reachability can be quite infrequent and/or DRX cycle length ranges from multiple minutes to hours), since the energy savings achievable by prolonging the sleep period alone may not be sufficient for realizing the targeted battery lifetimes for these devices (e.g., months to years).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A wireless device configured with a discontinuous reception (DRX) cycle which comprises a reachability cycle, a sleep cycle, and a synchronization cycle, the wireless device comprising:
a processor; and
a memory that stores processor-executable instructions, wherein the processor interfaces with the memory to execute the processor-executable instructions, whereby said wireless device is operable to:
estimate a total accumulated frequency drift of the sleep cycle, wherein the total accumulated frequency drift is equal to $\Delta f^*T_S$, wherein $\Delta f$ is a frequency drift per unit time of a local oscillator in the wireless device, and wherein $T_S$ is an estimated duration of the sleep cycle;
compute a number of Frequency Correction Bursts (FBs), Synchronization Bursts (SBs), and Normal Bursts (NBs) to be received to enable a correction of the estimated total accumulated frequency drift;
compute, during the reachability cycle, a time ($T_W$) for the synchronization cycle during which a synchronization procedure is to be performed based on (i) a known frame structure which indicates how many FBs, SBs, and NBs are expected during a certain period of time, (ii) a known amount of frequency drift that can be corrected from each reception of FB, SB, and NB, and (iii) the computed number of FBs, SBs, and NBs to be received to enable the correction of the estimated total accumulated frequency drift; and
set a timer with a time ($T_d$) based on the computed time ($T_W$) to wake up from the sleep cycle and perform the synchronization procedure,
wherein the reachability cycle occurs before the sleep cycle, and the sleep cycle occurs before the synchronization cycle.

2. The wireless device of claim 1, wherein the wireless device is further operable to:
wake up one or more times during the sleep cycle to perform one or more intermediate synchronization procedures when the estimated total accumulated frequency drift exceeds a threshold.

3. The wireless device of claim 2, wherein the wireless device is further operable to:
determine when to perform each of the one or more intermediate synchronization procedures based on a mobility of the wireless device.

4. The wireless device of claim 1, wherein the wireless device is further operable to perform the synchronization procedure, which includes being operable to:
synchronize a frequency and a time with a camped cell.

5. The wireless device of claim 4, wherein the wireless device is further operable to perform the synchronization procedure, which includes being operable to:
determine if the wireless device is receiving a signal associated with a previously camped cell or a new camped cell by checking a Training Sequence Code (TSC) indicated by a Base Station Identification Code (BSIC) of a Synchronization Burst (SB) or by checking a TSC in any received Normal Burst (NB).

6. The wireless device of claim 5, wherein the wireless device is further operable to perform the synchronization procedure, which includes being operable to:
receive in-phase and quadrature (I, Q) samples;
estimate a Received Signal Strength Indicator (RSSI) value using the received in-phase and quadrature (I, Q) samples;
verify if a C1/C2 criterion is fulfilled using the estimated RSSI value; and
schedule a Common Control Channel (CCCH) reading or a Routing Area Update (RAU) if the C1/C2 criterion is fulfilled.

7. A method in a wireless device configured with a discontinuous reception (DRX) cycle which comprises a reachability cycle, a sleep cycle, and a synchronization cycle, the method comprising:
estimating a total accumulated frequency drift of the sleep cycle, wherein the total accumulated frequency drift is equal to $\Delta f^*T_S$, wherein $\Delta f$ is a frequency drift per unit time of a local oscillator in the wireless device, and wherein $T_S$ is an estimated duration of the sleep cycle;
computing a number of Frequency Correction Bursts (FBs), Synchronization Bursts (SBs), and Normal Bursts (NBs) to be received to enable a correction of the estimated total accumulated frequency drift; and
computing, during the reachability cycle, a time ($T_W$) for the synchronization cycle during which a synchronization procedure is to be performed based on (i) a known frame structure which indicates how many FBs, SBs, and NBs are expected during a certain period of time, (ii) a known amount of frequency drift that can be corrected from each reception of FB, SB, and NB, and (iii) the computed number of FBs, SBs, and NBs to be received to enable the correction of the estimated total accumulated frequency drift; and
setting a timer with a time ($T_d$) based on the computed time ($T_W$) to wake up from the sleep cycle and perform the synchronization procedure,
wherein the reachability cycle occurs before the sleep cycle, and the sleep cycle occurs before the synchronization cycle.

8. The method of claim 7, further comprising:
waking up one or more times during the sleep cycle to perform one or more intermediate synchronization procedures when the estimated total accumulated frequency drift exceeds a threshold.

9. The wireless device of claim 8, further comprising:
determining when to perform each of the one or more intermediate synchronization procedures based on a mobility of the wireless device.

10. The method of claim 7, wherein the synchronization procedure comprises:
synchronizing a frequency and a time with a camped cell.

11. The method of claim 10, wherein the synchronization procedure further comprises:
determining if the wireless device is receiving a signal associated with a previously camped cell or a new camped cell by checking a Training Sequence Code (TSC) indicated by a Base Station Identification Code (BSIC) of a Synchronization Burst (SB) or by checking a TSC in any received Normal Burst (NB).

12. The method of claim 11, wherein the synchronization procedure further comprises:

receiving in-phase and quadrature (I, Q) samples;
estimating a Received Signal Strength Indicator (RSSI) value using the received in-phase and quadrature (I, Q) samples;
verifying if a C1/C2 criterion is fulfilled using the estimated RSSI value; and
scheduling a Common Control Channel (CCCH) reading or a Routing Area Update (RAU) if the C1/C2 criterion is fulfilled.

* * * * *

UNITED STATES PATENT AND TRADEMARK OFFICE
CERTIFICATE OF CORRECTION

PATENT NO. : 9,699,828 B2
APPLICATION NO. : 14/719225
DATED : July 4, 2017
INVENTOR(S) : Das et al.

It is certified that error appears in the above-identified patent and that said Letters Patent is hereby corrected as shown below:

In the Drawings

In Fig. 4, Sheet 3 of 7, delete "(T^S)=" and insert -- $(T_s)=$ --, therefor.

In Fig. 5B, Sheet 5 of 7, for Step "512", Line 4, delete "INSTANT" and insert -- INSTANCE --, therefor.

In Fig. 5B, Sheet 5 of 7, for Step "516", Line 1, delete "UP T" and insert -- UP $T_w$ --, therefor.

In the Claims

In Column 18, Line 51, in Claim 9, delete "The wireless device of" and insert -- The method of --, therefor.

Signed and Sealed this
Eighth Day of September, 2020

Andrei Iancu
*Director of the United States Patent and Trademark Office*